Patented Aug. 8, 1933

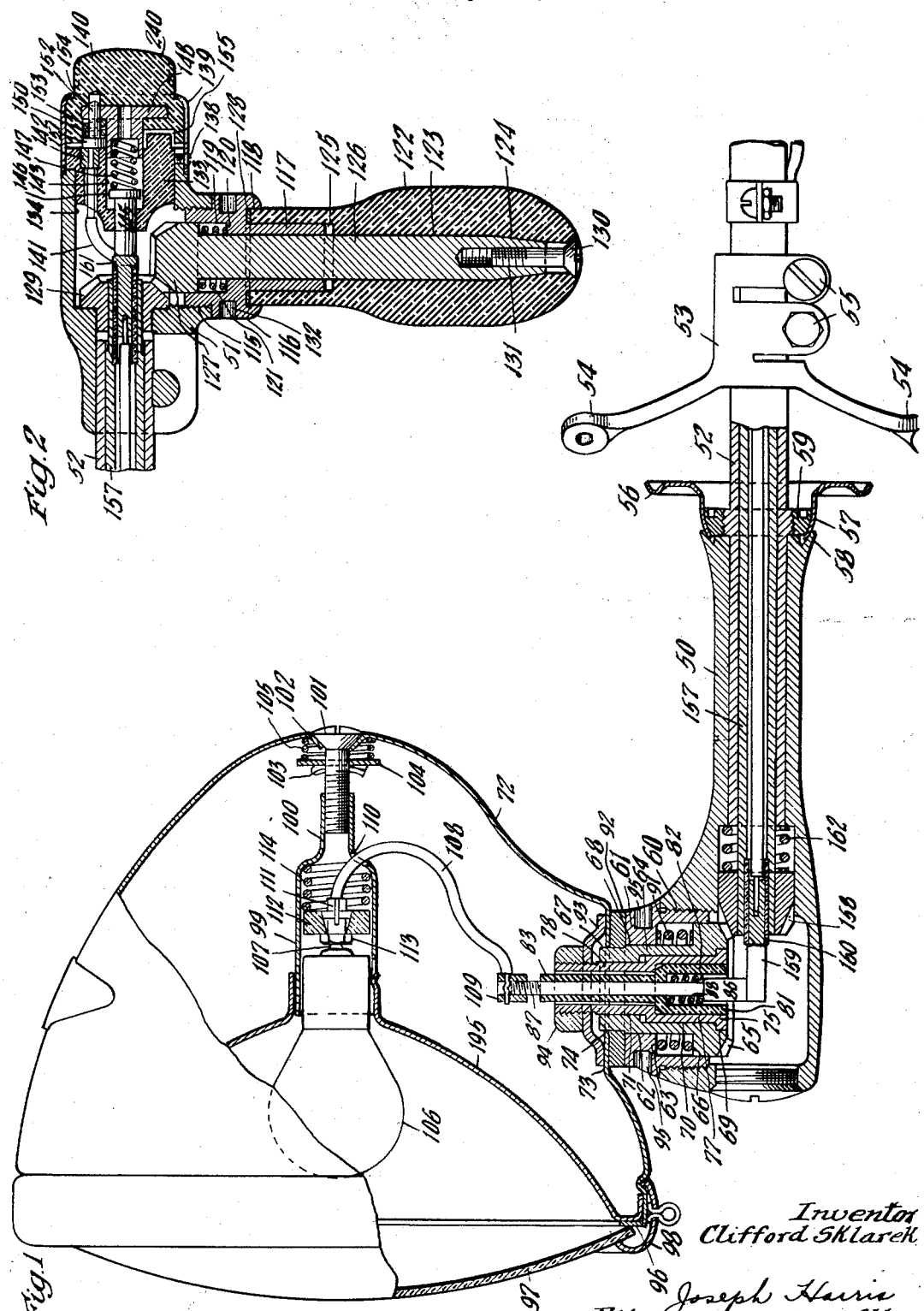

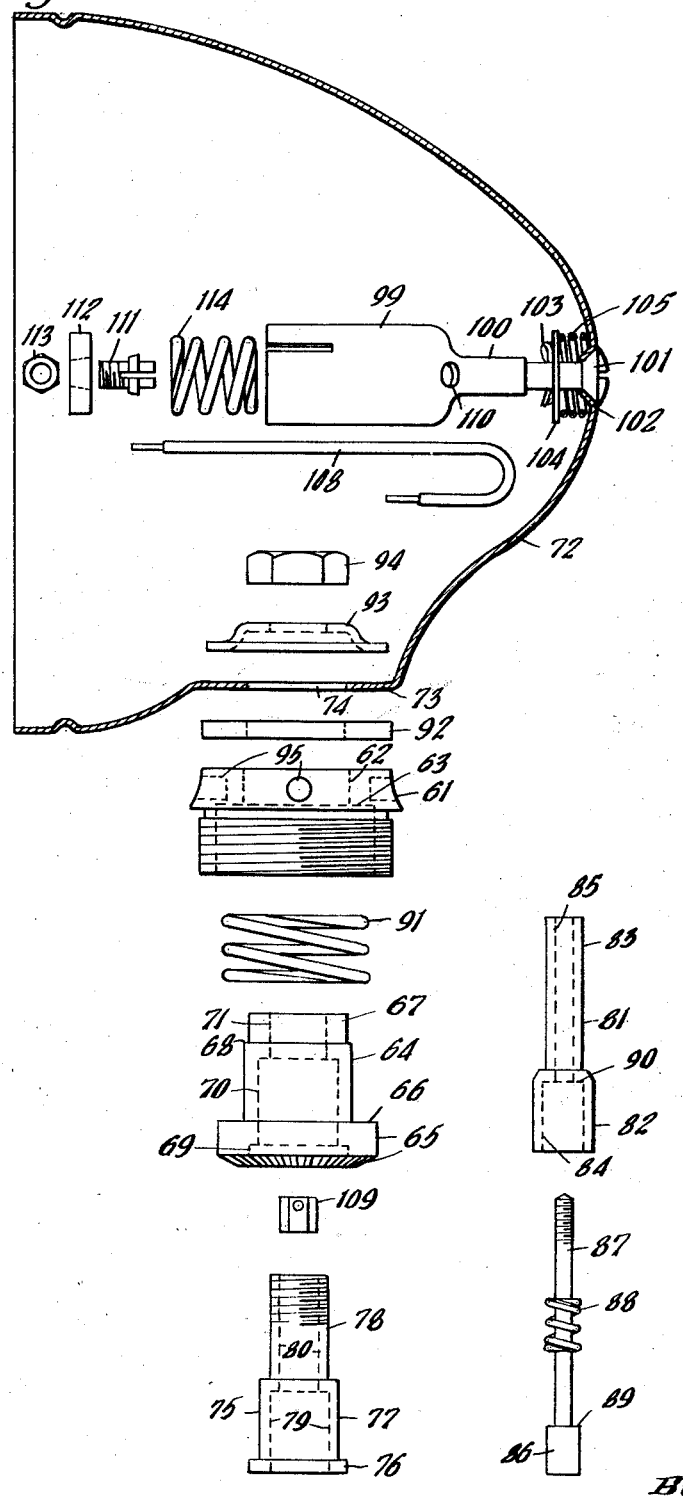

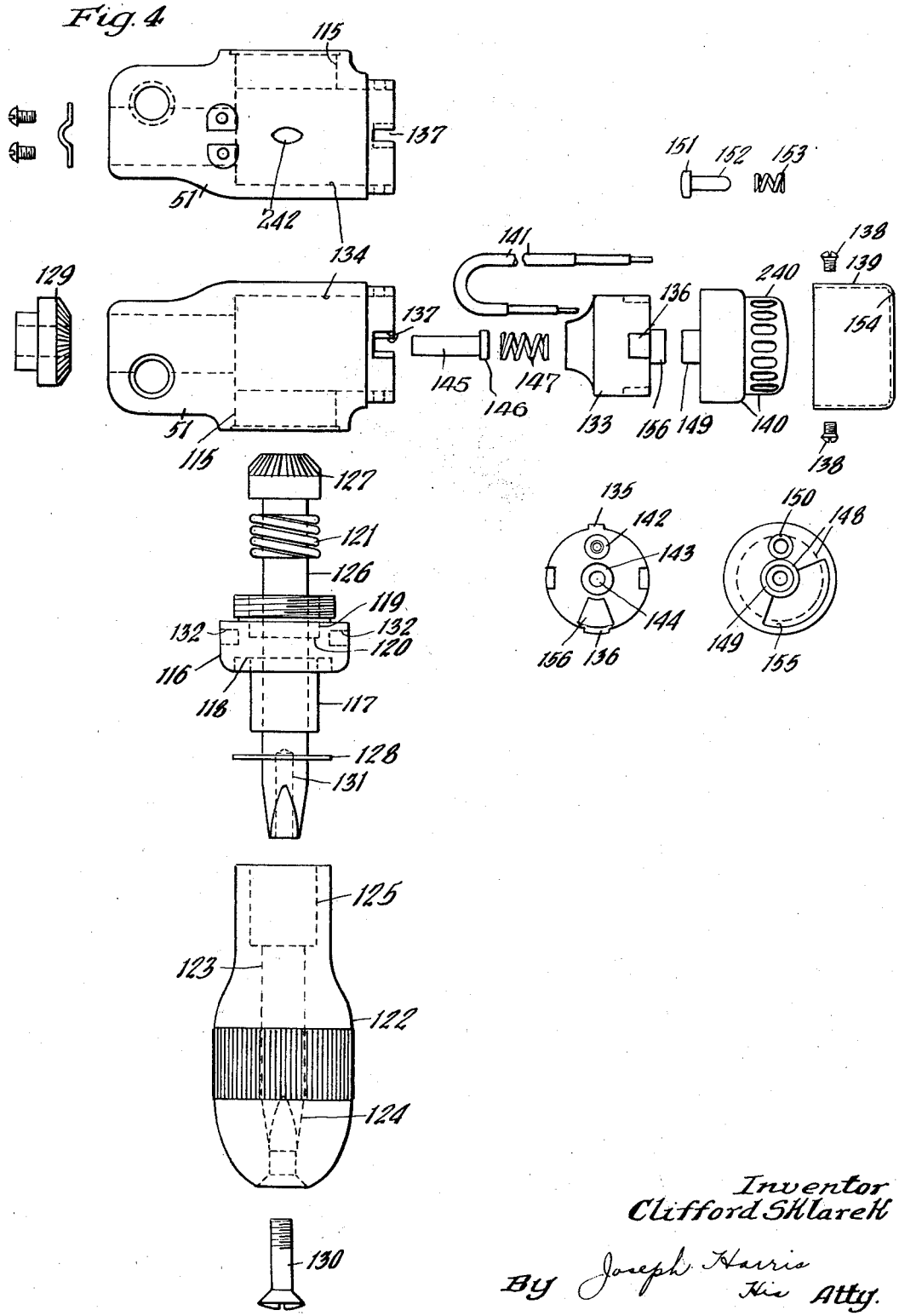

1,921,784

UNITED STATES PATENT OFFICE 1,921,784

DIRIGIBLE LIGHT

Clifford Sklarek, Chicago, Ill., assignor to International Spotlight Corporation, Chicago, Ill., a Corporation of Illinois Application September 29, 1930
Serial No. 485,001

4 Claims. (Cl. 240—61.13)

This invention relates to improvements in dirigible lights, and more particularly dirigible lights commonly called spotlights for use on automobiles and other automotive vehicles.

The present invention comprises certain improvements on that general type of dirigible lights disclosed in my prior Patents No. 1,704,225 of March 5, 1929; No. 1,747,739 of February 18, 1930, and 1,906,489 issued May 2, 1933. Generally speaking, the type of dirigible light shown in said patents is particularly adapted for inside control, that is, the lamp proper is on the outside of the superstructure of the automobile or other vehicle and the operating mechanism including the electrical controls are on the inside of the superstructure. Said dirigible lights comprise, broadly, head and handle housings rigidly connected by a tube adapted to be passed through the superstructure; a lamp carrying casing rotatably mounted on the head housing about an axis perpendicular to the axis of the connecting tube; a handle rotatably mounted on the handle housing at an angle to the axis of the connecting tube; geared operating mechanism from the handle through the connecting tube and to the lamp head casing for rotating the latter about its axis, the handle being also adapted to rotate the entire assembly about the axis of the connecting tube; and electrical circuits controlled by a switch in the handle housing, which electrical circuits are operative in any adjusted position of the parts and continuously throughout any desired amount of rotation of the entire assembly or lamp casing about its individual axis. Said type of dirigible lights is further characterized by the use of means, preferably in the form of springs, for compensating for any wear of the parts and for taking up slack which may be occasioned by permissible inaccuracies in manufacture, extended use and/or vibration incident to the use of the light on an automobile or other moving vehicle.

One object of the present invention is to provide a dirigible light of the type above generally indicated, which is comprised of a minimum number of parts easily assembled without the aid of any special tools or devices and wherein the cost of parts and labor for assembling are reduced to a minimum.

Another object of the present invention is to provide an inside controllable, dirigible light for automobiles and other automotive vehicle use wherein the lamp head or casing is universally adjustable and operated from an inside, single controlled handle with continuous electrical circuits to the lamp proper, which circuits are controlled by a novel switch adjacent the handle, the lamp head assembly and the handle assembly being so constituted that all the respective parts thereof may be readily assembled, one with the other, by hand and the use of a screw driver and simple wrench only, provision being made in the several parts and mode of assembly to compensate for permissible variations in manufacture and also to compensate for wear on any of the movable parts.

Other objects of the invention will more clearly appear from the description and claims hereinafter following.

In the drawings, forming a part of this specification, Figure 1 is a part vertical, sectional view, part elevational view illustrating a dirigible light embodying my improvements, certain parts being broken away in order to better illustrate the parts. Figure 2 is a sectional view illustrating more particularly the parts entering into the handle assembly. Figure 3 is a diagrammatic view illustrating the several elements entering into the lamp head assembly and with the several parts so disposed as to illustrate clearly the method of assembly thereof. In this diagrammatic or composite figure, the lamp casing is shown in section and the remaining parts in elevation. And Figure 4 is a view similar to Figure 3 illustrating diagrammatically the several elements entering into the handle assembly, the parts being illustrated, separated and in such manner as to best indicate the mode of assembly thereof.

In said drawings, 50 indicates a hollow lamp head housing; 51 a hollow handle housing, the same being rigidly connected by a tube 52 of suitable length, depending upon the superstructure of the vehicle on which the light is to be mounted and through which superstructure the tube 52 is adapted to be passed. Carried by the tube 52 is an inside bracket 53 having arms 54—54 adapted to be screwed or otherwise attached to the inside of the superstructure wall, said bracket 53 being adjustably frictionally held on the tube 52 by suitable means such as the screws 55, arranged to adjust the frictional grip, as will be understood. To the outer side of the superstructure wall or partition on which the light is to be mounted is secured an outside pressed metal bracket 56, having a ball section 57 cooperable with a corresponding ball section 58 at the inner end of the head housing 50, whereby the light may be adjusted to different angles with respect to the vehicle superstructure. A frictional grip is applied between the two ball sections 57 and 58 by means of a ball nut 59 threaded on the tube 52 within the bracket 56.

Referring first to the head assembly, illustrated in Figures 1 and 3, the head housing 50 is formed with a threaded, vertically extending opening 60 in which is screwed a sleeve 61 having a bearing 62 and a horizontal shoulder 63 therebelow. Rotatably mounted in the sleeve 61 is the hollow sleeve or journal 64 of a bevel gear 65, the latter providing an upwardly facing shoulder 66 opposed to the sleeve shoulder 63. The sleeve section 64 of the gear is of reduced diameter, as indicated at 67, at its upper end, thus forming a second upwardly facing shoulder 68. On its interior, the gear 65 is recessed so as to provide a circular lower portion 69 of largest diameter, an intermediate portion 70 of lesser diameter but of non-circular form, and an upper reduced diameter portion 71 for the purpose hereinafter described.

The lamp casing or shell 72 is formed on the underside thereof with a flat section 73 perforated, as indicated at 74. Adapted to be inserted through the gear 64—65 is a sleeve bolt 75 having a non-circular flange 76 at the bottom, a shank 77 conforming to the recess portion 70 of the bevel gear, and an upper bolt 78 of reduced diameter. The sleeve bolt 75 has the interior thereof provided with two portions 79 and 80 of larger and smaller diameter respectively and within which is received an insulating sleeve 81 having a lower portion 82 of size and section corresponding to the recessed portion 79, and an upper section 83 of reduced diameter extending loosely through and beyond the portion 80 of the recess of the sleeve bolt 75.

The insulating sleeve 81 is in turn interiorly recessed so as to provide a lower portion 84 of larger diameter and an upper elongated portion 85 of smaller diameter. The recess 84—85 is in turn adapted to receive and accommodate with free vertical movement the enlarged end 86 and smaller threaded shank 87 respectively of a contact plunger. A spring 88 is mounted on the shank 87 of the contact plunger and adapted to be interposed between the shoulder 89 of said plunger and the corresponding opposed shoulder 90 of the insulating sleeve 81.

The parts of the head assembly thus far described in detail are assembled in the following manner. The spring 88 is first slid over the shank of the contact plunger and the latter then inserted within the insulating sleeve 81. The insulating sleeve 81 is then inserted vertically within the sleeve bolt 75. The latter in turn is then inserted vertically within the bevel gear 64—65, which has slipped over the bearing section 64 thereof, a coil spring 91. These parts are then inserted within the bearing sleeve 61 and a washer 92 applied to the upper reduced end 67 of the gear 64—65. The extended upper ends of the gear 64—65, sleeve bolt 75, insulating sleeve 81 and contact plunger 86—87 are then passed vertically through the perforation 74 of the lamp casing 72, whereupon a cup washer 93 is put in place and the parts finally clamped and locked together by a nut 94 screwed on to the upper end of the sleeve bolt 75, the completed assembly being shown in Figure 1. In this manner, it is evident that the lamp casing is tightly clamped to the gear 64—65 and will rotate in unison therewith, as will also the sleeve bolt, insulating sleeve and contact plunger. Further, slack and any wear are compensated for by the spring 91 which will be placed under an initial compression so that the parts cannot become loose and vibrate. This assembly may then be attached to the head housing 50 by screwing home the bearing sleeve 61 as by the use of a spanner wrench cooperating with the spanner holes 95.

Still referring to Figures 1 and 3, the lamp casing 72 is shown as provided with a reflector 195, sealing gasket 96 and lens 97 all held in place by a suitable clamping ring 98. Axially adjustable with respect to the reflector 195 is a socket shell 99 having a reduced outer end 100 interiorly threaded to receive the shank of a screw 101, the head of which is exposed at the rear of the casing 72 and is adapted to be seated in a counter-sink 102. The shank of the screw 101 is apertured to receive the cotter 103, which retains a washer 104 in place, a spring 105 being interposed between said washer and the casing 72, as clearly shown in the drawings, whereby by adjusting the screw 101 the axial position of the socket shell 99 may be adjusted to properly focus the lamp proper 106 with respect to the preferably parabolic reflector 195 and still maintain all of the parts taut and free from vibration with respect to the lamp casing 72.

The lamp proper or bulb 106 may be of any well known commercial type arranged for bayonet socket attachment to the socket shell 99 and having a contact point 107 at its inner end. To provide the electrical connection from the contact plunger 86—87, insulated wire 108 is employed, the lower end of which is free of the insulation and placed in electrical contact with the plunger by being passed through apertures in a nut 109 and screwed down against the upper end of the contact plunger. The wire 108 is run through an aperture 110 in the shell 99 and the other end thereof with the insulation removed is inserted within a tapered contact threaded plug 111 adapted to be passed through a tapered opening in an insulator washer 112 and secured and squeezed by a nut 113 applied to the threaded end of the plug. With this construction, the end of the wire 108 is securely clamped in place without solder and the nut 113 forms the electrical connection with the contact 107 of the bulb, the parts being insulated from the shell 99 by the insulating washer 112. The nut 113 is yieldingly held in contact with the bulb by a suitable spring 114 interposed between the washer 112 and the neck of the shell 99.

Referring next to the handle assembly, shown in Figures 2 and 4, the handle housing 51 is shown as having a vertical threaded opening 115 into which is adapted to be threaded a bearing 116, the latter having a depending hollow sleeve 117 with an annular recess 118 therearound on the underside of the bearing. On its upper side, the bearing 116 has the opening enlarged, as indicated at 119, to form a shoulder 120 against which seats a coil spring 121.

The handle proper is indicated at 122, the same having a central aperture 123 tapered at its lower end, as indicated at 124, and enlarged at its upper end, as indicated at 125. Adapted to be received within the opening 123—124 is the lower portion of a shank 126 formed integral with a bevel gear 127, the lower end of said shank being tapered to non-rotatably fit the tapered portion 124 of the handle recess so as to effect rotation of the gear 127 simultaneously with the rotation of the handle 122. One or more shims 128 are arranged to be employed between the upper end of the handle 122 and the bearing 116, said shims seating within the recess 118 and their number or thickness compensating for any variations in manufacture of the parts and particularly with reference to length of the shank of the gear 127 and its operative position relative to a cooperating transmitting bevel gear 129, hereinafter referred to.

The parts of the handle thus specifically described are assembled first by placing the spring 121 on the shank of the bevel gear 127, then slipping on the bearing 116, and then the shim 128. These parts are then assembled with the handle 122 and securely locked together by a screw 130 entered through the bottom of the handle 122 into a threaded opening 131 in the lower end of the shank 126. With the parts thus assembled, they may be applied to the handle housing 51 by screwing the bearing 116 in place, preferably by a spanner wrench co-acting with spanner openings 132.

The switch assembly, also shown in Figures 2 and 4, includes a lead-in block 133 of bakelite or other suitable insulating material adapted to be inserted endwise in an opening 134 provided in the outer end of the handle housing 51. In this connection, to prevent improper assembly of the lead-in block and handle housing, the former is preferably provided with two diametrically disposed lugs 135 and 136 of different widths, cooperable with corresponding width slots 137 formed at the outer end of the handle housing 51. The lead-in block is secured in place by suitable means, such as the screws 138—138, which also secure a hollow sheet metal cover 139 for the rotor knob 140, hereinafter described.

Electric current from any suitable source, such as the battery of the car, is brought to the lead-in block 133 by a suitable insulated wire 141, which is entered through an opening 242 of the handle housing 51. The interior end of said wire 141 has the insulation thereon removed and is soldered or sweated to a small brass ring 142 cast within the lead-in block 133. The lead-in block is also centrally apertured, as indicated at 143, said aperture having an inner portion 144 of reduced diameter within which is slidably received a contact plunger 145 having a headed end 146 against which bears a spring 147 seated within the recess 143.

Cooperable with the lead-in block 133 is the rotor 140, also preferably of bakelite and within which is housed a centrally disposed flanged brass contact element 148, said element having a recessed sleeve extension 149 which extends partially within the recess 143 of the lead-in block and within which is accommodated the outer end of the spring 147. Off center, the rotor 140 is recessed, as indicated at 150, to receive a contact plunger 151 having a reduced shank 152 over which is assembled a spring 153. The shank 152 has electrical contact with the contact element 148 and said plunger is obviously normally always urged toward the contact 142 of the lead-in block. As will be evident, upon rotation of the rotor 140, the contact plunger 151 will be brought into and out of contact with the contact button 142 of the lead-in block, thus making and breaking the circuit, depending upon the angular position of the rotor 140. The latter has its exterior of reduced diameter, as indicated at 240, which is passed through a perforation 154 in the cap 139 so that the extended portion of the rotor, preferably knurled, may be manipulated by the operator's fingers. To limit the rotation of the rotor 140, the latter is provided with a segmental recess 155 on the face opposite the lead-in block and the latter is provided with a cooperating segmental lug 156 of smaller size so that the rotor will be stopped at either limit of its throw in either contact position or off position.

Rotatably mounted within the tubular connection 52 is a hollow shaft 157 to the lefthand end of which, as viewed in Figure 1, is rigidly secured a bevel gear 158 adapted to cooperate with the bevel gear 65. Secured within the hollow shaft 157 at the lefthand end, as viewed in Figure 1, is a cylindrical contact 159 adapted to have rotatable contact with the lower end of the plunger 86—87, which is yieldingly held in contact therewith by the spring 88; said contact 159 being insulated from the shaft 157, as indicated at 160. At its opposite end, the shaft 157 is provided with a similar contact element 161 insulated with respect thereto and projecting endwise therefrom. Said shaft 157 has its end of square or other non-circular cross section and loosely, but non-rotatably mounted on the squared section, is the bevel gear 129, hereinbefore referred to. Said contact element 161 projects outwardly beyond the bevel gear 129 and its end is adapted to engage the spring pressed plunger 145. A spring 162 is interposed between the gear 158 and an opposed shoulder of the head housing 50, as shown in Figure 1, so as to maintain the two bevel gears 158 and 64—65 properly in mesh without slack or backlash. Referring to Figure 2, it will be evident that the spring 121 serves to maintain the two bevel gears 127 and 129 in proper mesh without slack or blacklash.

With the construction hereinbefore described, it is evident that I eliminate all soldering in the electrical connections with the one exception of the lead-in wire to the lead-in block 133. Further, variations in manufacture of the parts and compensation for wear are obtained in the head assembly by reason of the construction hereinbefore described in detail. In connection with the electrical connection extending from one end of the shaft 157 to the other end (the two contact elements 159 and 161 being electrically connected by a suitable wire), it will be evident that any variation in the length of said shaft and consequently variation in the location of the righthand end of the contact element 161, will be automatically compensated for by the spring pressed contact plunger 145 in the switch assembly. In case of adjustment of the parts or repairs or replacements, it is evident that the entire head assembly including the bearing sleeve 61, may be removed without disturbing any of the other parts or taking the light from the superstructure. Similarly, the entire switch assembly may be removed from the handle housing 51 by simply taking out the screws 138 and without disturbing any of the other parts of the light. Also, the handle assembly may be taken out and adjustments and substitutions made without disturbing any of the other parts of the light. From the preceding description, it will also be seen that all of the parts may be assembled in a very simple manner and quickly without the aid of any special tools other than a screw driver and wrench or pliers for screwing home the several nuts or threaded sleeve bearings. The arrangement, for a dirigible light of the type indicated, comprises a minimum number of parts and minimum cost of labor for assembling while retaining all of the desirable features of compensation for inaccuracies of manufacture and take-up, due to wear of the parts.

I have herein shown and described what I now consider the preferred manner of carrying out my invention, but the same is merely illustrative and I contemplate all changes and modifications that come within the scope of the claims appended hereto.

I claim:

1. In a dirigible light, the combination with longitudinally separated head and handle housings rigidly associated by a tubular connection; of a bearing sleeve mounted in the head housing; a gear journaled in said sleeve; expansible means interposed between said sleeve and gear; a sleeve bolt longitudinally insertible within the gear; a lamp carrying casing; means rigidly securing said casing, gear and bolt together to rotate in unison as a unit and relatively to said bearing sleeve, said expansible means automatically taking up wear between said unit and bearing sleeve; a handle carried by the handle housing; and operating means between said handle and gear for effecting rotation of the latter.

2. In a dirigible light, the combination with longitudinally separated head and handle housings rigidly associated by a tubular connection; of a bearing sleeve mounted in the head housing; a gear journaled in said sleeve; a sleeve bolt longitudinally insertible within the gear; a lamp carrying casing rigidly secured to said gear and bolt to rotate in unison therewith; an insulating sleeve extending through said bolt and within said casing; a contact plunger extending through said insulating sleeve and within the casing; an electrical conductor extending from the end of said plunger to the lamp; a rotary contact element extending through said tubular connection and cooperable with said contact plunger; a handle carried by the handle housing; and operating means between the handle and gear for effecting rotation of the latter.

3. In a dirigible light having a head housing, the combination with a bearing sleeve removably attached to the head housing; a gear insertible endwise within said sleeve and rotatable therein; a sleeve bolt insertible endwise within the gear and rotatable therewith; an insulating sleeve insertible endwise within the bolt; a contact plunger insertible endwise within the insulating sleeve; a spring interposed between the bearing sleeve and gear; a spring interposed between said contact plunger and insulating sleeve; a lamp carrying casing; and means for rigidly connecting said casing with the gear to rotate in unison therewith.

4. In a dirigible light, the combination with longitudinally separated head and handle housings rigidly associated by a tubular connection; of a bearing sleeve mounted in said handle housing, said sleeve having an interior upwardly facing shoulder and an exterior downwardly facing shoulder; a gear having a downwardly facing shoulder and a journal shank extended through said bearing; spring means interposed between said gear shoulder and upwardly facing sleeve shoulder; and a handle detachably secured to the extended portion of the journal shank, said handle having a shoulder adapted to cooperate with said exterior shoulder of the bearing sleeve.

CLIFFORD SKLAREK.